(12) United States Patent
Hikichi

(10) Patent No.: US 8,310,691 B2
(45) Date of Patent: Nov. 13, 2012

(54) PRINTING SYSTEM, METHOD, PROGRAM, AND STORAGE MEDIUM, HAVING PRINT AND COPY RESTRICTION

(75) Inventor: Yukiyoshi Hikichi, San Mateo, CA (US)

(73) Assignee: Canon Kabushiki Kaisha (JP)

( * ) Notice: Subject to any disclaimer, the term of this patent is extended or adjusted under 35 U.S.C. 154(b) by 1174 days.

(21) Appl. No.: 12/128,178

(22) Filed: May 28, 2008

(65) Prior Publication Data

US 2008/0297825 A1    Dec. 4, 2008

(30) Foreign Application Priority Data

Jun. 1, 2007    (JP) ................................ 2007-146949

(51) Int. Cl.
*G06K 15/00*    (2006.01)
(52) U.S. Cl. ..................... 358/1.14; 358/1.15; 358/3.28; 726/6; 726/7
(58) Field of Classification Search ................ 358/1.13, 358/1.14, 3.28, 464; 707/1; 399/411; 400/62; 726/6, 7; 700/67
See application file for complete search history.

(56) References Cited

U.S. PATENT DOCUMENTS

| | | | |
|---|---|---|---|
| 6,396,594 B1 * | 5/2002 | French et al. | 358/1.13 |
| 6,621,590 B1 * | 9/2003 | Livingston | 358/1.15 |
| 6,661,530 B1 * | 12/2003 | Munetomo et al. | 358/1.15 |
| 7,168,868 B2 * | 1/2007 | Uchida et al. | 358/3.28 |
| 7,218,976 B2 * | 5/2007 | Minagawa | 700/67 |
| 7,686,525 B2 * | 3/2010 | Uchida | 400/76 |
| 2002/0059318 A1 * | 5/2002 | Nomura et al. | 707/200 |
| 2002/0065807 A1 * | 5/2002 | Kawamoto et al. | 707/1 |
| 2005/0007618 A1 * | 1/2005 | Thomason | 358/1.14 |
| 2005/0117180 A1 * | 6/2005 | Kato | 358/1.15 |
| 2005/0135856 A1 * | 6/2005 | Uchida et al. | 399/411 |
| 2005/0275867 A1 * | 12/2005 | Higashiura et al. | 358/1.14 |
| 2005/0275868 A1 * | 12/2005 | Higashiura et al. | 358/1.14 |
| 2006/0028667 A1 * | 2/2006 | Saito | 358/1.13 |
| 2006/0055952 A1 * | 3/2006 | Ferlitsch | 358/1.13 |

(Continued)

FOREIGN PATENT DOCUMENTS

JP    2002-103753 A    4/2002

(Continued)

OTHER PUBLICATIONS

Office Action issued Sep. 21, 2011 for corresponding JP2007146949.

*Primary Examiner* — Twyler Haskins
*Assistant Examiner* — Nicholas Pachol
(74) *Attorney, Agent, or Firm* — Rossi, Kimms & McDowell LLP

(57) ABSTRACT

A printing system which is capable of preventing print restriction information from affecting the embedding of copy restriction information, thereby being capable of positively performing copy restriction on printed documents. An information processing apparatus includes a print restriction information-receiving section that acquires print restriction information for restricting use of functions concerning printing processing, a copy restriction information-acquiring section that acquires copy restriction information for restricting copying of a document printed based on print data, and a copy restriction information and print restriction information-adding section that adds the copy restriction information and print restriction information to the print data. A management server includes a copy restriction information and print restriction information incompatibility-determining section that determines compatibility between the print restriction information and printing conditions of the copy restriction information, and changes the print restriction information based on a result of determination of the compatibility.

9 Claims, 15 Drawing Sheets

U.S. PATENT DOCUMENTS

| | | | |
|---|---|---|---|
| 2006/0103868 A1* | 5/2006 | Mitsui | 358/1.13 |
| 2006/0140699 A1* | 6/2006 | Uchida et al. | 400/62 |
| 2006/0147236 A1* | 7/2006 | Uchida et al. | 400/62 |
| 2006/0250631 A1* | 11/2006 | Igarashi | 358/1.13 |
| 2006/0268306 A1* | 11/2006 | Kojima et al. | 358/1.13 |
| 2007/0024901 A1* | 2/2007 | Kayama | 358/1.15 |
| 2007/0065208 A1* | 3/2007 | Uchida et al. | 400/76 |
| 2007/0109593 A1* | 5/2007 | Ohta et al. | 358/1.15 |
| 2007/0121174 A1* | 5/2007 | Higashiura | 358/464 |
| 2007/0127055 A1* | 6/2007 | Kujirai et al. | 358/1.14 |
| 2007/0172281 A1* | 7/2007 | Inoue et al. | 400/62 |
| 2007/0201926 A1* | 8/2007 | Kato | 400/62 |
| 2007/0229871 A1* | 10/2007 | Hikichi | 358/1.13 |
| 2007/0231038 A1* | 10/2007 | Uchida | 400/76 |
| 2007/0263241 A1* | 11/2007 | Nakayama | 358/1.13 |
| 2008/0007760 A1* | 1/2008 | Kimura | 358/1.14 |
| 2008/0018942 A1* | 1/2008 | Komiya | 358/3.28 |
| 2008/0028448 A1* | 1/2008 | Tsuchitoi | 726/6 |
| 2008/0079990 A1* | 4/2008 | Iida | 358/1.15 |
| 2008/0080000 A1* | 4/2008 | Kadota | 358/1.15 |
| 2008/0192286 A1* | 8/2008 | Shaw | 358/1.15 |
| 2008/0204793 A1* | 8/2008 | Shaw | 358/1.15 |
| 2011/0176177 A1* | 7/2011 | Uchida et al. | 358/3.28 |

FOREIGN PATENT DOCUMENTS

| | | |
|---|---|---|
| JP | 2003-280469 A | 10/2003 |
| JP | 2004-220532 A | 8/2004 |
| JP | 2005175773 A | 6/2005 |
| JP | 2006174085 A | 6/2006 |
| JP | 2006268837 A | 10/2006 |

* cited by examiner

FIG. 4

| USER ID 1502 | COLOR PRINTING 1504 | SINGLE-SIDED PRINTING 1506 | Nup FORCED 1508 | MAXIMUM PRINTING RESOLUTION (dpi) 1510 | PRINT COUNT RESTRICTION (PAGES/MONTH) 1512 |
|---|---|---|---|---|---|
| UID001 | PERMITTED | PERMITTED | NOT FORCED | 1200 | NOT RESTRICTED |
| UID002 | PERMITTED | PERMITTED | NOT FORCED | 1200 | 1000 |
| UID003 | INHIBITED | PERMITTED | NOT FORCED | 1200 | 1000 |
| UID004 | INHIBITED | PERMITTED | FORCED TO EXECUTE 2up PRINTING | 600 | 1000 |
| UID005 | PERMITTED | INHIBITED | FORCED TO EXECUTE 4up PRINTING | 600 | 500 |
| ... | ... | ... | ... | ... | ... |

FIG. 11

| | | |
|---|---|---|
| 1 | USER-SPECIFIC RESTRICTION | PROBLEMS OCCURRING IN EMBEDDING OF COPY RESTRICTION INFORMATION |
| 2 | COLOR PRINTING RESTRICTION (COPY, BOX PRINT) | IMPOSSIBLE TO EMBED LVBC IN YELLOW (YELLOW TONER) SO AS TO MAKE EMBEDDING UNOBTRUSIVE |
| 3 | LAYOUT RESTRICTION (COPY, BOX PRINT) | A FEAR OF FAILURE IN BARCODE READING DUE TO CHANGE IN SIZE OF LVBC OR BARCODE CAUSED BY SIZE REDUCTION e.g. DUE TO 2in1 |
| 4 | COLOR SCAN RESTRICTION (COPY, BOX PRINT) | IMPOSSIBLE TO ENTER DATA TO BE EMBEDDED IN THE SAME COLOR AS USED IN COLOR PRINTING |
| 5 | SINGLE-SIDED PRINTING RESTRICTION (COPY, BOX PRINT) | A FEAR OF FAILURE IN READING DUE TO APPEARING OF A REVERSE-SIDE IMAGE IN LVBC OR BARCODE, IF DOUBLE-SIDED PRINTING IS PERFORMED USING THIN SHEET |

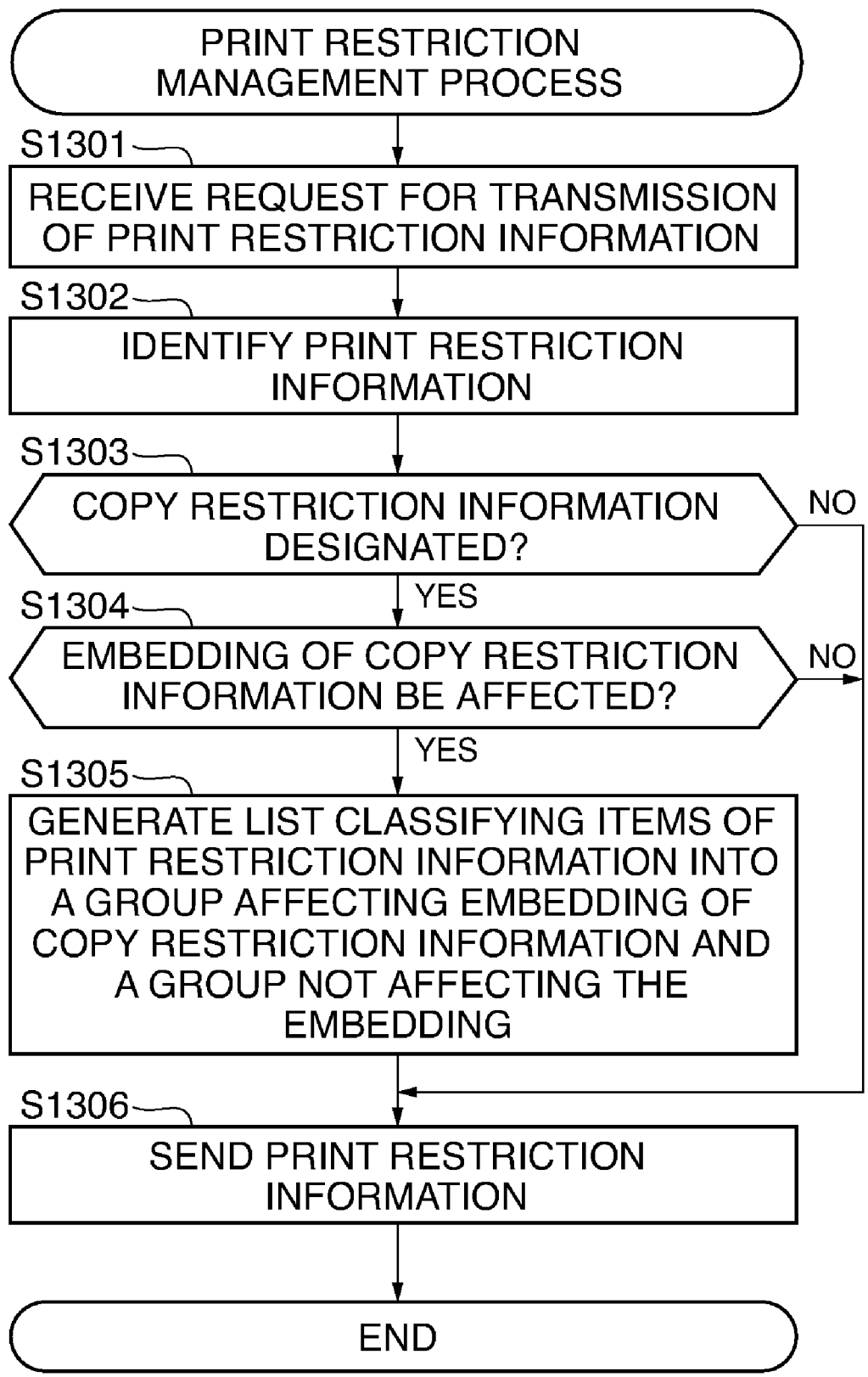

PRINTING SYSTEM, METHOD, PROGRAM, AND STORAGE MEDIUM, HAVING PRINT AND COPY RESTRICTION

BACKGROUND OF THE INVENTION

1. Field of the Invention

The present invention relates to a printing system to which an image forming apparatus, an information processing apparatus, and a management server are connected via a network. More specifically, the present invention relates to a printing system that embeds copy restriction information for controlling the copying of a printed document, a print restriction method for the printing system, a program, and a storage medium.

2. Description of the Related Art

Recently, as more IT systems and apparatuses are introduced into offices, interest in security is growing. For example, there often occurs an incident of leakage of customer information which a company has. This means that privacy of individuals is threatened, which raises a serious social problem.

To cope with such problems, countermeasures are taken by setting access rights for access to electronic confidential information and setting up a device for surveillance in firewall, in order to prevent leakage of information to the outside of an office. The other countermeasures include inhibition of bringing in or out notebook computers and transportable media, such as USB memories.

In the case of the electronic confidential information, by deciding and implementing a policy on the above-mentioned surveillance, it is possible to provide protection on the information. However, when the confidential information is printed on a sheet medium by a printing apparatus, it is difficult to check the bringing of the sheet medium having the confidential information printed thereon out of an office, and inhibit the medium from being carried out of the office. The maintenance of security is more difficult in this case than in the case of restricting the electronic confidential information from being brought out of the office.

In view of these circumstances, there has been proposed a technique of embedding control information in a document when printing the same, for controlling e.g. permission or inhibition of copying of the printed document under specified conditions, to thereby secure security for copying thereof. Specifically, there has been disclosed a technique of embedding the above-mentioned control information in the form of a dot pattern or a barcode in an original to thereby restrict copying of the original (see e.g. Japanese Patent Laid-Open Publication No. 2003-280469).

In this technique, control information describing restriction of a copying operation is embedded as an image pattern in a printed document, and is read when reading an image of the printed document. Based on the read information, complicated control such as inhibition of copying or permission of copying under specified conditions is determined, whereby it is possible to automatically control the copying operation, saving user's time and effort.

On the other hand, in a printer (image forming apparatus) commonly used by a plurality of computers, with a view to improving printing processing efficiency or attaining effective use of consumables, various kinds of restriction are provided on the functions of printing processing of the printer which are permitted to be used by users.

For example, in a printer which places a restriction on the permission of color printing on a user basis, when a request for an operation of color printing is received, printing is performed after automatically changing the printing condition of color printing into monochrome printing (see e.g. Japanese Patent Laid-Open Publication No. 2002-103753)

For a printer which forcibly performs scaled-down printing on a user basis, there has been proposed a technique of reducing data for two pages to data for one page and printing the reduced data. Further, when double-sided printing is forced, even when a request for single-sided printing is made, the printer automatically executes double-sided printing.

A technique is also proposed in which such optimization of printing is performed not only after the printer automatically changes the settings of printing but also after once displaying a print changing function for the user when changing the printing conditions (see e.g. Japanese Patent Laid-Open Publication No. 2004-220532).

However, the above-mentioned conventional techniques suffer from the following problems: As described in Japanese Patent Laid-Open Publication No. 2003-280469, when performing printing by embedding copy restriction information by a barcode or dot pattern, a change in the printing conditions having effects on a user basis also affects embedded information, which makes it impossible to properly embed the information.

For example, as described in Japanese Patent Laid-Open Publication No. 2002-103753, the printer changes the printing condition of color printing to monochrome printing. Even when desired to add copy restriction information in the form of a yellow dot pattern so as to make the information unobtrusive, the function of monochrome printing acts to make it impossible to embed the print restriction information in an unobtrusive manner. Further, when a forced change to double-sided printing is made, an image embedded on the reverse side of a sheet appears on an image embedded on the front side, for example, depending on the type of the sheet, which makes it impossible to properly read the embedded information. Further, when printing is executed by forcedly reducing the size of image data, the embedded image is also reduced in size, which can result in breakage of the embedded information.

SUMMARY OF THE INVENTION

The present invention provides a printing system which is capable of preventing print restriction information from affecting the embedding of copy restriction information, thereby being capable of positively performing copy restriction on printed documents.

In a first aspect of the present invention, there is provided a printing system including an information processing apparatus, and a printing apparatus that performs image formation based on print data transmitted from the information processing apparatus, comprising a print restriction information-acquiring unit configured to acquire print restriction information for restricting use of functions concerning printing processing which can be specified in the print data, a copy restriction information-acquiring unit configured to acquire copy restriction information for restricting copying of a printed document printed based on the print data, a copy restriction information-adding unit configured to add the copy restriction information acquired by the copy restriction information-acquiring unit to the print data, a determination unit configured to determine compatibility between the print restriction information and printing conditions of the copy restriction information, and a changing unit configured to change the print restriction information based on a result of determination of the compatibility.

With the configuration of the printing system according to the first aspect of the present invention, it is possible to prevent print restriction information from affecting the embedding of copy restriction information, thereby positively performing copy restriction on a printed document.

In a second aspect of the present invention, there is provided a print restriction method for a printing system including an information processing apparatus, and a printing apparatus that performs image formation based on print data transmitted from the information processing apparatus, comprising a print restriction information-acquiring step of acquiring print restriction information for restricting use of functions concerning printing processing which can be specified in the print data, a copy restriction information-acquiring step of acquiring copy restriction information for restricting copying of a printed document printed based on the print data, a copy restriction information-adding step of adding the copy restriction information acquired in the copy restriction information-acquiring step to the print data, a determination step of determining compatibility between the print restriction information acquired in the print restriction information-acquiring step and printing conditions of the copy restriction information acquired in the copy restriction information-acquiring step, and a change step of changing the print restriction information based on a result of determination of the compatibility in the determination step.

In a third aspect of the present invention, there is provided a program for causing a computer to execute a print restriction method for a printing system including an information processing apparatus, and a printing apparatus that performs image formation based on print data transmitted from the information processing apparatus, wherein the print restriction method comprises a print restriction information-acquiring step of acquiring print restriction information for restricting use of functions concerning printing processing which can be specified in the print data, a copy restriction information-acquiring step of acquiring copy restriction information for restricting copying of a printed document printed based on the print data, a copy restriction information-adding step of adding the copy restriction information acquired in the copy restriction information-acquiring step to the print data, a determination step of determining compatibility between the print restriction information acquired in the print restriction information-acquiring step and printing conditions of the copy restriction information acquired in the copy restriction information-acquiring step, and a change step of changing the print restriction information based on a result of determination of the compatibility in the determination step.

In a fourth aspect of the present invention, there is provided a computer-readable storage medium storing a program for program for causing a computer to execute a print restriction method for a printing system including an information processing apparatus, and a printing apparatus that performs image formation based on print data transmitted from the information processing apparatus, wherein the print restriction method comprises a print restriction information-acquiring step of acquiring print restriction information for restricting use of functions concerning printing processing which can be specified in the print data, a copy restriction information-acquiring step of acquiring copy restriction information for restricting copying of a printed document printed based on the print data, a copy restriction information-adding step of adding the copy restriction information acquired in the copy restriction information-acquiring step to the print data, a determination step of determining compatibility between the print restriction information acquired in the print restriction information-acquiring step and printing conditions of the copy restriction information acquired in the copy restriction information-acquiring step, and a change step of changing the print restriction information based on a result of determination of the compatibility in the determination step.

The features and advantages of the invention will become more apparent from the following detailed description taken in conjunction with the accompanying drawings.

BRIEF DESCRIPTION OF THE DRAWINGS

FIG. 4 is a view showing an example of print restriction information stored by the management server appearing in FIG. 1.

FIG. 11 is a table listing cases of the print restriction information affecting the embedding of coy restriction information, by way of example, in the image forming apparatus control system shown in FIG. 1.

FIG. 15 is a flowchart of a print restriction management process performed by a management server in the image forming apparatus control system as the printing system according to the second embodiment of the present invention.

DETAILED DESCRIPTION OF THE EMBODIMENTS

The present invention will now be described in detail with reference to the accompanying drawings showing preferred embodiments thereof.

Figure 1:
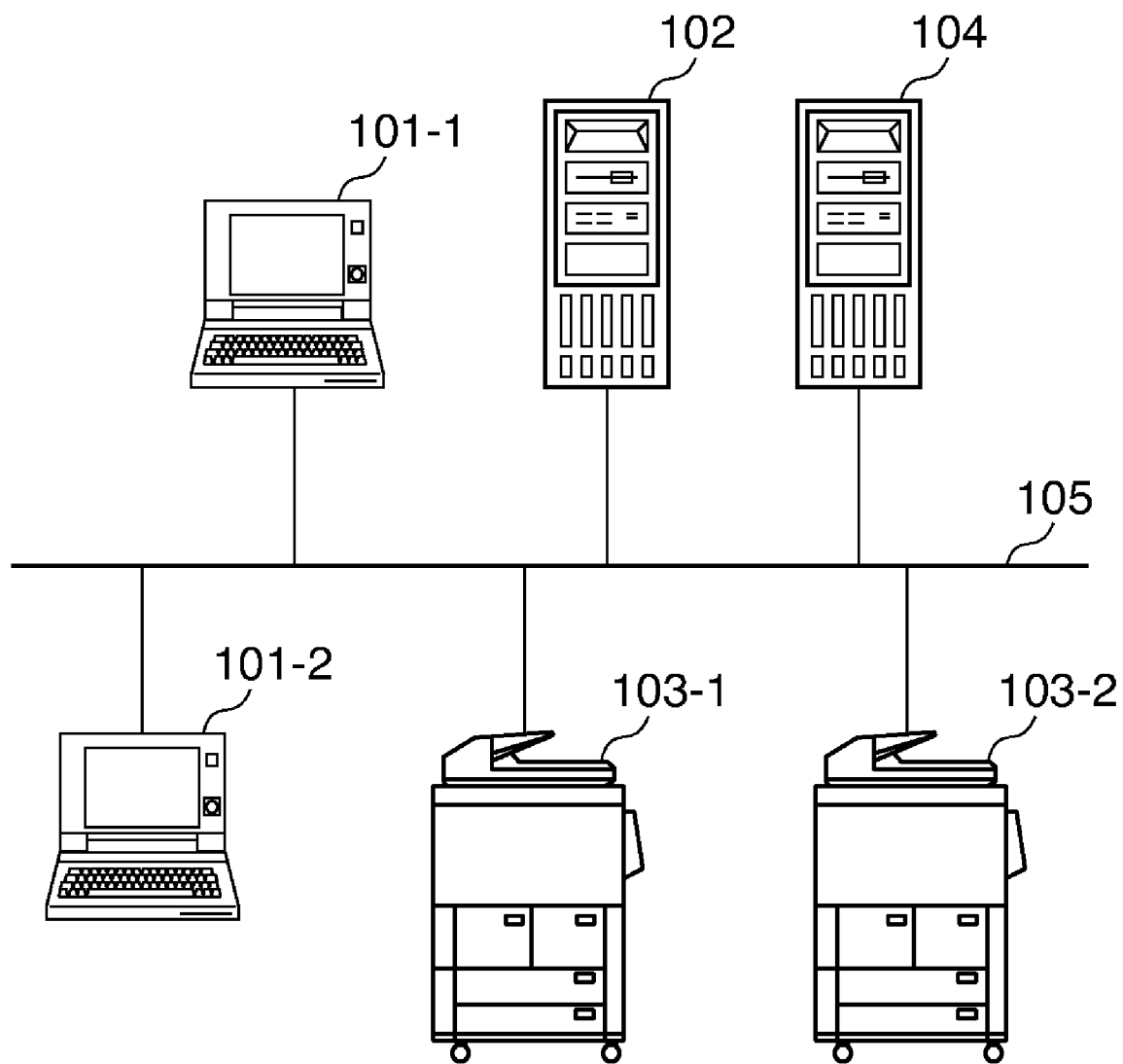
FIG. 1 is a whole conceptual view of an image forming apparatus control system as a printing system according to a first embodiment of the present invention.

FIG. 1 is a whole conceptual view of an image forming apparatus control system according to a first embodiment of the present invention.

Referring to FIG. 1, the image forming apparatus control system includes a plurality of information processing apparatuses (client PCs) 101 (101-1 and 101-2), a print server 102, a plurality of image forming apparatuses 103 (103-1 and 103-2), and a management server 104. The above-mentioned apparatuses are connected via a network (LAN) 105, and each have a function of communicating over the network 105.

Each image forming apparatus 103 has the functions of a copying machine and a printer. The management server 104 registers users who use the image forming apparatus 103 and the functions of the image forming apparatus 103 which are permitted to be used on a user-by-user basis.

The information processing apparatus 101 operated by a user generates print data and transmits the generated print data to the print server 102. The print server 102 forwards the received print data to the image forming apparatus 103. The image forming apparatus 103 interprets the received print data to convert the same into an image, and print the image on sheets (image formation) to thereby generate a printed document.

It should be noted that the above description shows an example of the configuration of the system, and it is possible to envisage a configuration without the print server 102. In this case, the information processing apparatus 101 directly transmits the print data to the image forming apparatus 103.

Figure 2:
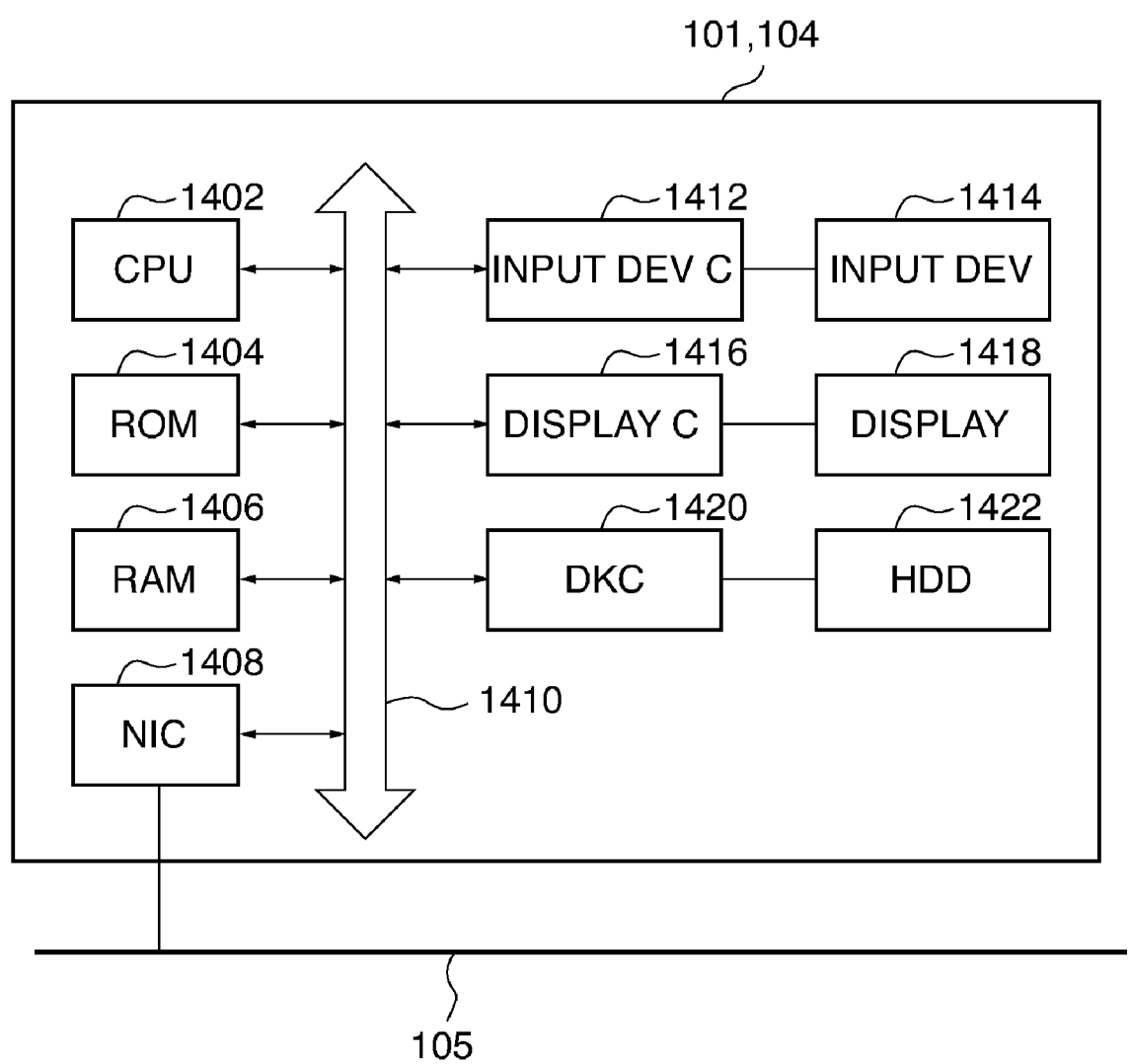
FIG. 2 is a view showing an example of hardware configuration of an information processing apparatus and a management server appearing in FIG. 1.

FIG. 2 is a view showing an example of hardware configuration of the information processing apparatus and the management server appearing in FIG. 1. The information processing apparatus 101 and the management server 104 have the hardware configuration of a so-called computer, and have a common basic configuration.

As shown in FIG. 2, the information processing apparatus 101 and the management server 104 each include a CPU 1402 which executes software stored in a ROM 1404 or a hard disk 1422. The CPU 1402 provides overall control of devices connected to a system bus 1410.

The hard disk (HDD) 1422 is also used as a storage area for storing not only the software but also various kinds of information. A RAM 1406 serves as a main memory, a work area, and so forth, for the CPU 1402. An external input controller (Input Dev C) 1412 controls input instructions from an input section (Input Dev) 1414 comprised of a keyboard and a mouse. A display controller (Display C) 1416 controls display executed by a display module (Display) 1418 which is implemented e.g. by a liquid-crystal display.

A network interface card (NIC) 1408 exchanges data bidirectionally with other network devices via the LAN 105. Moreover, the HDD 1422 is sometimes used as a temporary storage area for information during processing by the CPU 1402.

Figure 3:
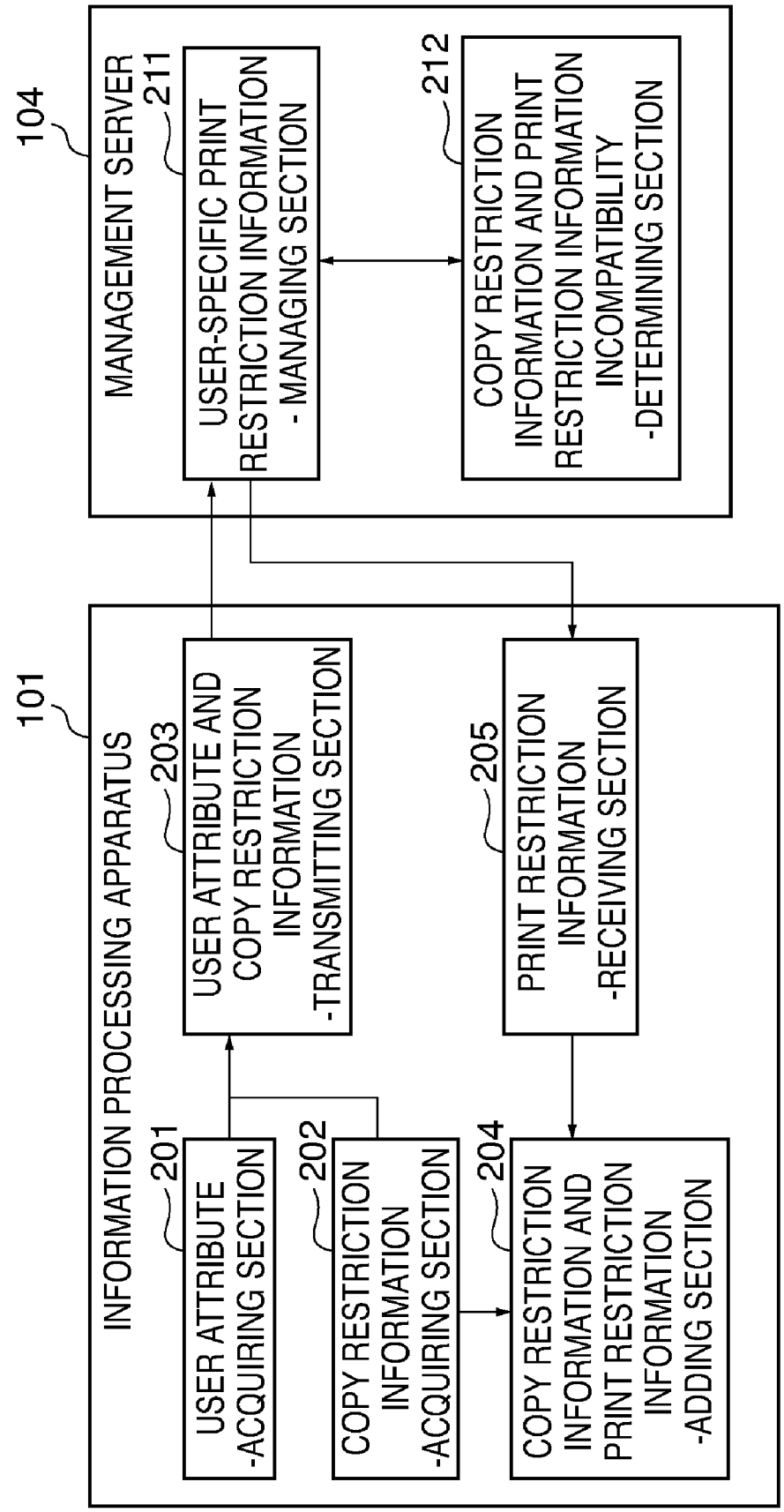
FIG. 3 is a functional block diagram of the information processing apparatus and the management server appearing in FIG. 1.

FIG. 3 is a functional block diagram of the information processing apparatus and the management server appearing in FIG. 1.

In FIG. 3, each block shows a module, and each arrow between blocks indicates the direction of flow of data or instructions. Each module may be software provided for the information processing apparatus 101 or the management server 104. In this case, the software corresponding to each module is stored in the HDD 1422 or the ROM 1404 in FIG. 2. Further, the function of each module may be realized by hardware such as a gate array.

It should be noted that the information processing apparatus 101 is a client computer used by a user. The information processing apparatus 101 is comprised of hardware, such as a personal computer, and software, such as a printer driver and word-processing software. The information processing apparatus 101 has a plurality of function modules therein.

A user attribute-acquiring section 201 acquires user ID as information for identifying an user who uses the image forming apparatus 103. The user attribute-acquiring section 201 operates when the user prints a document using the printer driver, in response to the user inputting an user ID and a password with a keyboard (corresponding to the input section 1414 in FIG. 2) so as to use the image forming apparatus 103.

A copy restriction information-acquiring section 202 acquires settings of copy restriction. The copy restriction information-acquiring section 202 acquires detailed settings of copy restriction, such as inhibition of copying of a document printed by a printer, inhibition of copying of a document with the lapse of a certain time period, or the like. A detailed description will be given hereinafter with reference to FIG. 6. A user attribute and copy restriction information-transmitting section 203 transmits the data of the user attributes and the copy restriction information to the management server 104 via the network 105.

A copy restriction information and print restriction information-adding section 204 adds the copy restriction information acquired by the copy restriction information-acquiring section 202 and print restriction information received at a print restriction information-receiving section 205, to the print data. The print restriction information-receiving section 205 receives the print restriction information from the management server 104.

The management server 104 includes a user-specific print restriction information-managing section 211, and a copy restriction information and print restriction information incompatibility-determining section 212.

The user-specific print restriction information-managing section 211 associates a user ID which is information for uniquely identifying a user with print restriction information for the user, to form user-specific print restriction information, and stores and manages the user-specific print restriction information. The print restriction information is stored in the HDD 1422 in FIG. 2. The copy restriction information and print restriction information incompatibility-determining section 212 checks a compatibility between the print restriction information and the printing conditions of the copy restriction information, specifically, whether or not the print restriction information affects the embedding of the copy restriction information.

The management server 104 collates the information (user ID and copy restriction information) sent from the information processing apparatus 101 against internal information (print restriction information), and sends back the print restriction information details of which are changed as required to the print restriction information-receiving section 205 of the information processing apparatus 101. The copy restriction information and print restriction information-adding section 204 adds the copy restriction information acquired by the copy restriction information-acquiring section 202 and the print restriction information received at the print restriction information-receiving section 205 to print data.

The data of these items of information is added as image processing information to the print data of a document to be printed. The printer driver of the information processing apparatus 101 transmits the data of the document and the added data to the image forming apparatus 103 via the network 105.

It should be noted that in general, the management server 104 is often installed independently of the plurality of information processing apparatuses 101 so as to be referred to thereby, but the present printing system may be configured such that one of the information processing apparatuses 101 executes the functions of the management server 104.

FIG. 4 is a view showing an example of the print restriction information stored in the management server 104.

The copy restriction information is stored in a nonvolatile storage medium such as the hard disk (the HDD 1422 in FIG. 2) of the management server 104.

The print restriction information is a table associating the user ID 1502 and the print restriction settings (1504 to 1512). The print restriction settings are provided for setting restrictions, on a user basis, on print processing-related functions which can be specified in print data.

Color Printing 1504 is an item showing whether to permit or inhibit color printing. In the example illustrated in FIG. 4, color printing is permitted for users UID001, UID002, and UID005 but inhibited for users UID003 and UID004. Single-Sided Printing 1506 is an item showing whether to permit or inhibit single-sided printing.

Nup Forced 1508 is an item showing whether to force Nup printing. The term "Nup printing" is intended to mean "printing N pages of print data on one sheet by reducing the size of each page", and is also called "Nin1 printing". In the illustrated example in FIG. 4, the users UID001, UID002, and UID003 are not forced to execute Nup printing. On the other hand, the user UID004 is forced to execute 2up printing. Further, the user UID005 is forced to execute 4up printing.

Maximum Printing Resolution 1510 is an item showing a maximum value of a printing resolution selectable by the user in the case of causing printing processing to be executed. Print Count Restriction 1512 is an item showing a maximum number of pages which the user can print per month.

In the present embodiment, the management server 104 stores print restriction information holding the setting items of print restriction as shown in FIG. 4, but other setting items other than the above-mentioned ones may be provided as the setting items of print restriction.

Next, to describe an instruction issued for embedding information for inhibiting copying or tracking printout and a copy inhibiting operation, first, a description will be given of the overall operation of the present system.

Referring to FIG. 1, let it be assumed that the user operates the information processing apparatus 101 to give an instruction for embedding information for inhibiting copying or tracking printout. In response to the instruction, the image forming apparatus 103 embeds the information for inhibiting copying or the information for tracking printout in a printout as a background image, to thereby generate the printout.

Figure 5:
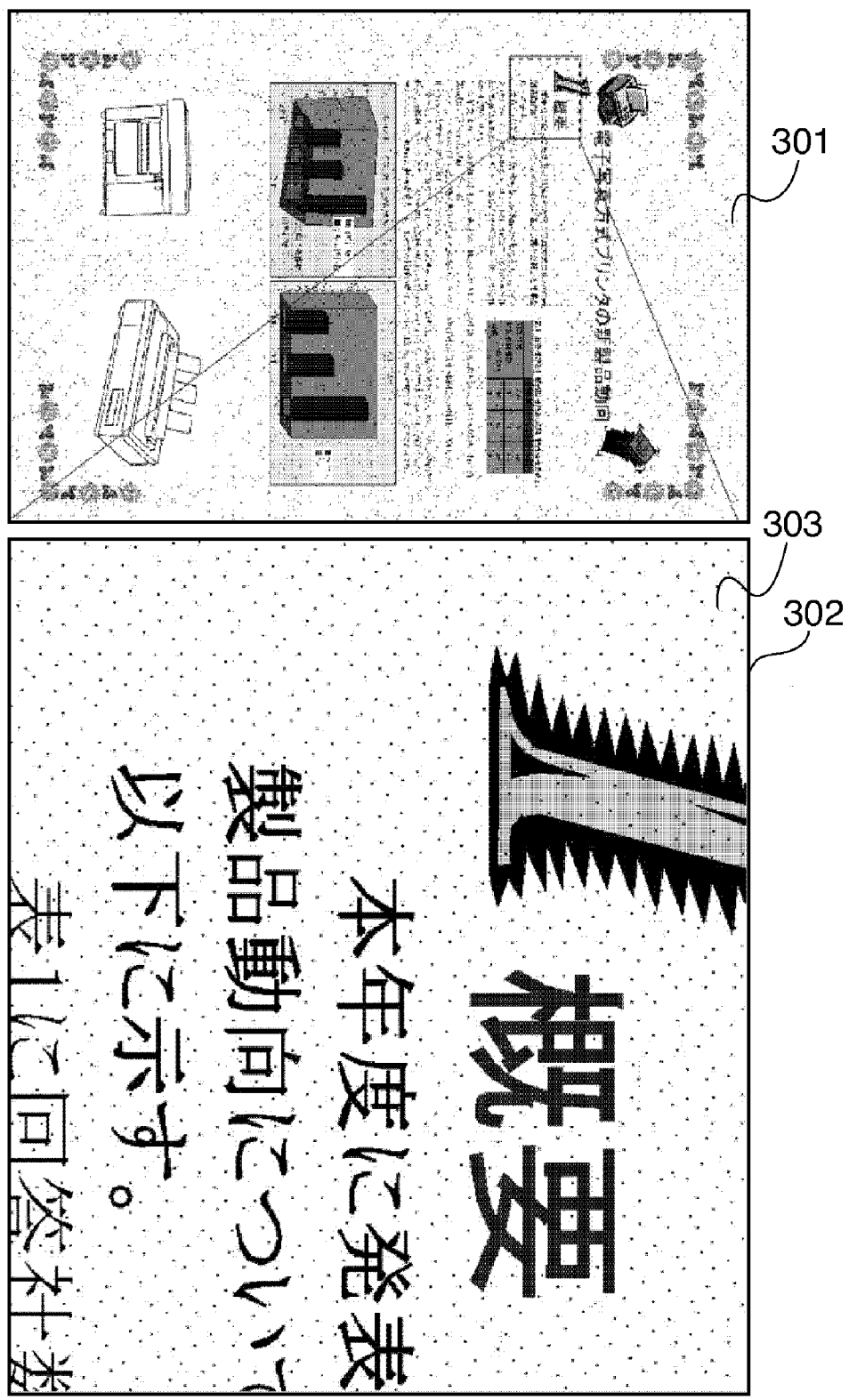
FIG. 5 is a view showing a printed document including a background image generated by an image forming apparatus appearing in FIG. 1.

FIG. 5 is a view showing a printed document including a background image generated by the image forming apparatus appearing in FIG. 1. A detailed description of the printed document will be given hereinafter with reference to FIG. 5.

Details of a sequence of operations from a user's operation to generation of a printout will be described hereinafter with reference to FIG. 10.

As shown in FIG. 5, if the user attempts to copy a printed document as an original, which contains copy inhibiting information, using the image forming apparatus 103, the image forming apparatus 103 detects that the copy inhibiting information is contained in the original and then stops the copying operation. This prevents important documents from being copied.

The above is a brief description of the operations of the whole system. In the following, a more detailed description will be given of how these operations are sequentially performed.

Now, the designation of copy restriction information or tracking information is performed will be described.

Figure 6:
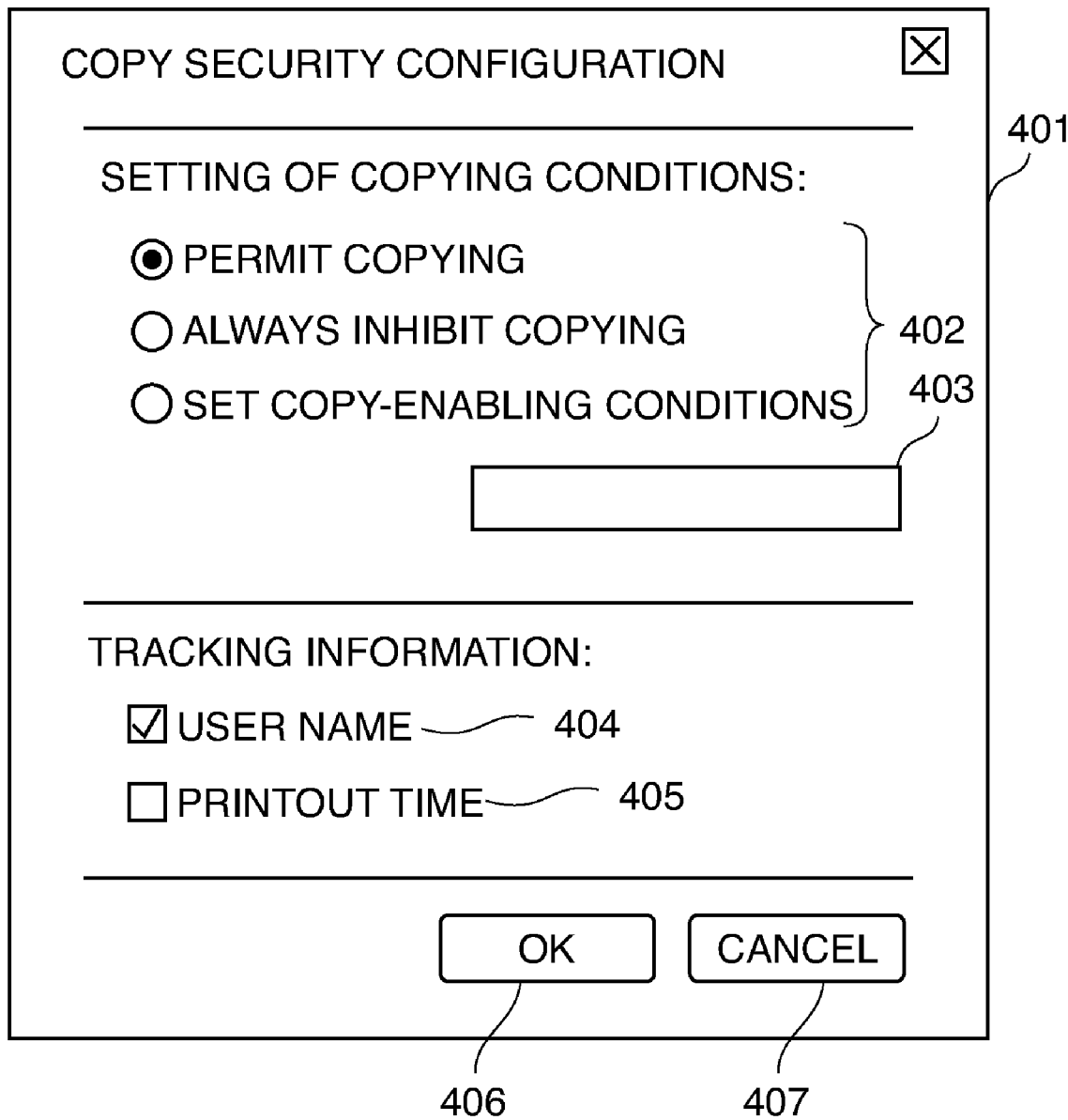
FIG. 6 is a view showing a configuration screen of a printer driver of the information processing apparatus appearing in FIG. 1.

FIG. 6 is a view showing a configuration screen of a printer driver of the information processing apparatus 101 appearing in FIG. 1. The printer driver is installed in the information processing apparatus 101.

The user sets details of security information desired to be embedded in the printout by operating on a copy security configuration dialog 401 in FIG. 6.

The copy security configuration dialog 401 is largely divided into two parts. The upper half is for setting inhibition of copying, and the lower half is for setting tacking of information.

To begin with, the upper half where the inhibition of copying is configured will be described. In the illustrated example, the user operates one of radio buttons 402 to thereby select one of three settings: "permit copying", "always inhibit copying", and "set copy-enabling conditions".

When the third option of "set copy-enabling conditions" is selected, a password input field 403 is changed into an input-enabled state, and hence the user can input a password for canceling the inhibition of copying to the password input field 403.

Next the lower half of the copy security configuration dialog 401 where tracking information is set will be described. In the illustrated example, there are disposed two check boxes 404 and 405, and the user can specify embedding of information on a user name and/or a printout time by checking associated one(s) of the two check boxes 404 and 405.

When the user presses an OK button 406, the above-described pieces of configuration information are stored in a job restriction information-holding section 804 described hereinafter with reference to FIG. 10. Furthermore, the storing of the configuration information can be canceled by a cancel button 407.

Now, a description will be given, by way of example, of a screen displayed when the image forming apparatus 103 detects that copy inhibiting information is contained in the original, during the copy inhibiting operation executed by the image forming apparatus 103.

Figure 7:
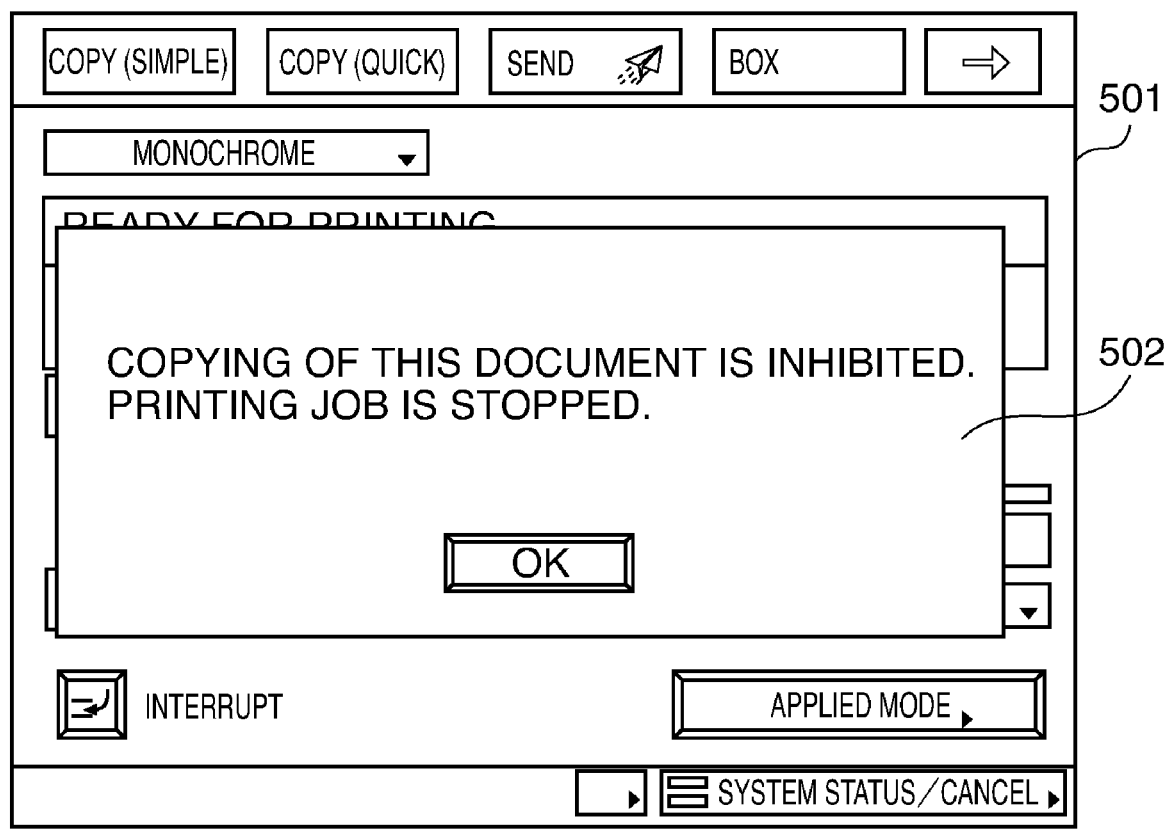
FIG. 7 is a view showing an example of a screen displayed when the image forming apparatus appearing in FIG. 1 detects that copy inhibiting information is contained in an original, and stops a copying operation.

FIG. 7 is a view showing an example of a screen displayed when the image forming apparatus appearing in FIG. 1 detects that copy inhibiting information is contained in the original, and then stops the copying operation.

The example in FIG. 7 shows the screen displayed on a display section (not shown) of the image forming apparatus 103 when a printed document in which information was embedded based on the setting of "always inhibit copying" selected from the three setting options described with reference to FIG. 6 is used as an original to be copied.

Referring to FIG. 7, a message saying that the copying operation is stopped is displayed on the operating screen 501 by a message dialogue 502. The message dialogue 502 is displayed after the user gives a copying instruction to the image forming apparatus 103, and the image forming apparatus 103 scans the original and analyzes the copy restriction information on the original.

Next, LVBC (Low Visibility Barcode) will be described as a suitable example of the encoded information embedding technique used in the present invention.

The term "information embedding technique" used in the present embodiment refers to a technique in which the system of the image forming apparatus adds desired information to an image to be originally printed on an image forming medium (hereinafter referred to as "the sheet") such as a sheet or an OHP sheet, and then prints the image on the medium.

General requirements of the information embedding technique are as follows: (1) Data can be embedded in a sheet such that a sufficient amount of data required for information embedding is embedded. (2) Information embedded in a sheet using a color material (toner or ink) can be positively extracted afterwards as digital information. (3) A certain degree of resistance is provided against factors impeding extraction of information, such as rotation of the original, enlargement, reduction, and partial deletion of the image, attenuation of a signal due to copying, stains, etc., which can be caused when an image of an original is copied on a sheet. (4) A real-time property is provided which enables extraction of information during a copying operation, or a high-speed property substantially conforming or close to the real-time property, so as to prevent copying of an original the copying of which is inhibited.

The LVBC in the present embodiment satisfies the above-mentioned requirements.

FIG. 5 is a view showing an example of an original (or part of a printed document) having the LVBC embedded therein.

In FIG. 5, a part of a sheet 301 is shown in an enlarged view (302). In the enlarged view (302), there are shown not only an image originally formed in the original, but also numerous dots 303 embedded seemingly at random. Information to be added is embedded in these dots.

Next, a description will be given of an LVBC embedding method.

In the LVBC embedding method, not only an image to be printed on a sheet, but also a dot pattern called a grid is printed so as to embed additional information. In FIG. 5, reference numeral 303 designates each of dots 303 which constitutes the grid.

The grid itself is a combination of dots vertically and horizontally arranged at equal space intervals. When the dots disposed on the grid are connected with shortest distances by respective imaginary lines (guide lines), there appear an imaginary grid pattern formed by the imaginary lines vertically and horizontally drawn at predetermined space intervals.

Additional information is input as binary data which is not larger than a predetermined size. Information embedding is realized by displacing each dot for additional information with respect to (from the center of) an associated one of dots (grid points) constituting the grid, vertically, horizontally, or diagonally, i.e. in one of eight directions.

Figure 8:
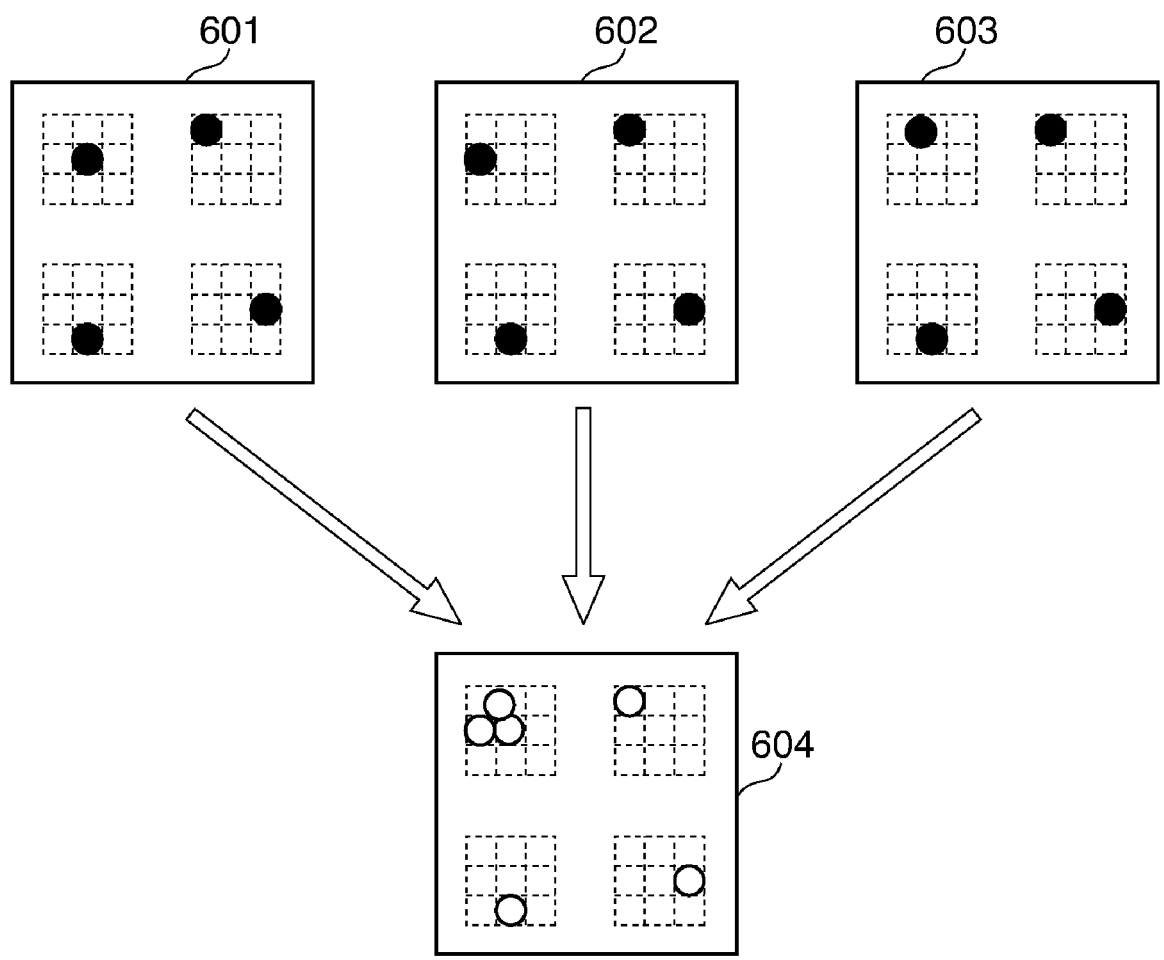
FIG. 8 is a schematic view useful in explaining a dot arrangement in FIG. 5.

FIG. 8 is a schematic view which is useful in explaining the arrangement of dots appearing in FIG. 5.

In FIG. 8, areas 601 to 603 are formed as images disposed at respective different locations. When they are superposed one upon another, they form a dot arrangement pattern 604. Of course, the images cannot be free from displacement due to noise and errors, but the pattern repeatedly appears at fixed space intervals, and the most frequent values are determined by totalizing all the areas, which after all makes it possible to remove the noise and errors from the dot arrangement pattern 604.

Figure 9:
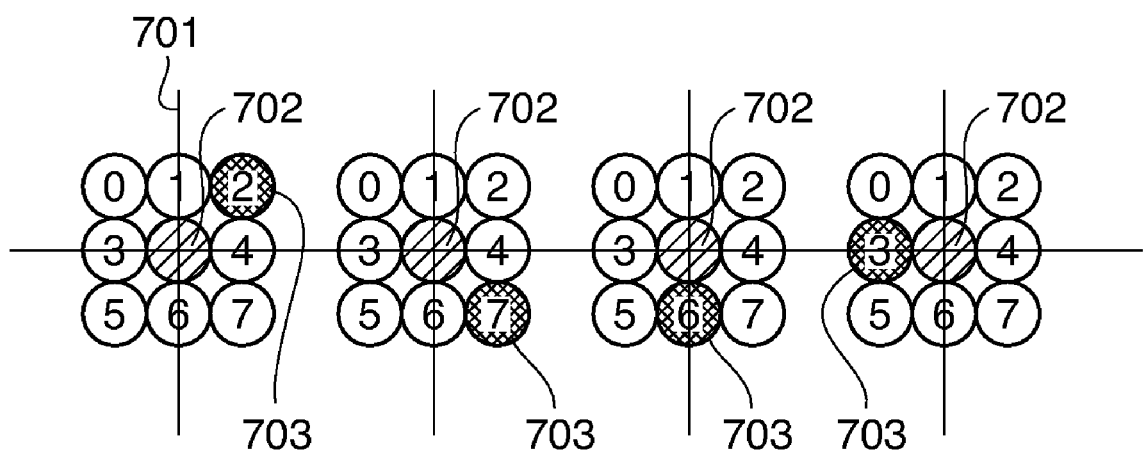
FIG. 9 is a view showing an example of embedding of additional information in the form of binary data in a printed document printed by the image forming apparatus appearing in FIG. 1.

FIG. 9 is a view showing, by way of example, a case where binary data of 0101111110011b is embedded as additional information in a printed document printed by the image forming apparatus 103 appearing in FIG. 1.

Referring to FIG. 9, vertical and horizontal lines 701 show the imaginary guide lines indicating respective positions of grid points. When the grid points are connected to each other by the vertical and horizontal lines 701 with a shortest distance as mentioned above, the grid pattern appears. Reference numeral 702 designates a center where no dot is disposed. In actuality, a dot for additional information is disposed e.g. at a location designated by reference numeral 703, which is away from the center 702, in a displaced manner.

The data of 0101111110011b is decomposed into 3-bit groups, i.e. 010, 111, 110, and 011. Further, the 3-bit groups are subjected to decimal conversion to be converted into 2, 7, 6, and 3, respectively. As shown in FIG. 9, each of the dots constituting the grid is displaced, vertically, horizontally, or diagonally, i.e. in one of the eight directions with respect to the center in a manner associated with a numerical value, whereby information can be represented.

In this case, the respective pieces of information of the numerical values 2, 7, 6, and 3 can be embedded by displacing the respective dots right upward, right downward, downward, and leftward, respectively. When the LVBC is used, it is possible to embed additional information of approximately 2000 bytes in a sheet by repeatedly carrying out the above-described processing.

Further, by embedding dots representing additional information in the sheet a plurality of times, it is possible to increase redundancy to thereby improve reliability against erroneous image recognition and stains, creases, and partial breakage of the information. This will be explained in detail hereinafter in a description of the LVBC analysis method.

It should be noted that in the case of analyzing LVBC, it is required to accurately grasp the respective positions of grid points, and it is preferred that dot displacements in the eight directions occur with equal probability. However, it is sometimes desired that lots of specific data representative of e.g. 0 are contained in the embedded data. In such a case, dot displacements in the eight directions cannot occur with equal probability unless further processing is executed.

To solve this problem, in the present embodiment, reversible scrambling (e.g. shared key encryption processing) is performed on embedded information to randomize dot displacement, whereafter the information is embedded in a sheet.

LVBC embedding is a digital-to-analog conversion in which additional information as digital data is recorded on a sheet as analog data, and hence it is possible to realize the same with a relatively simple mechanism.

Figure 10:
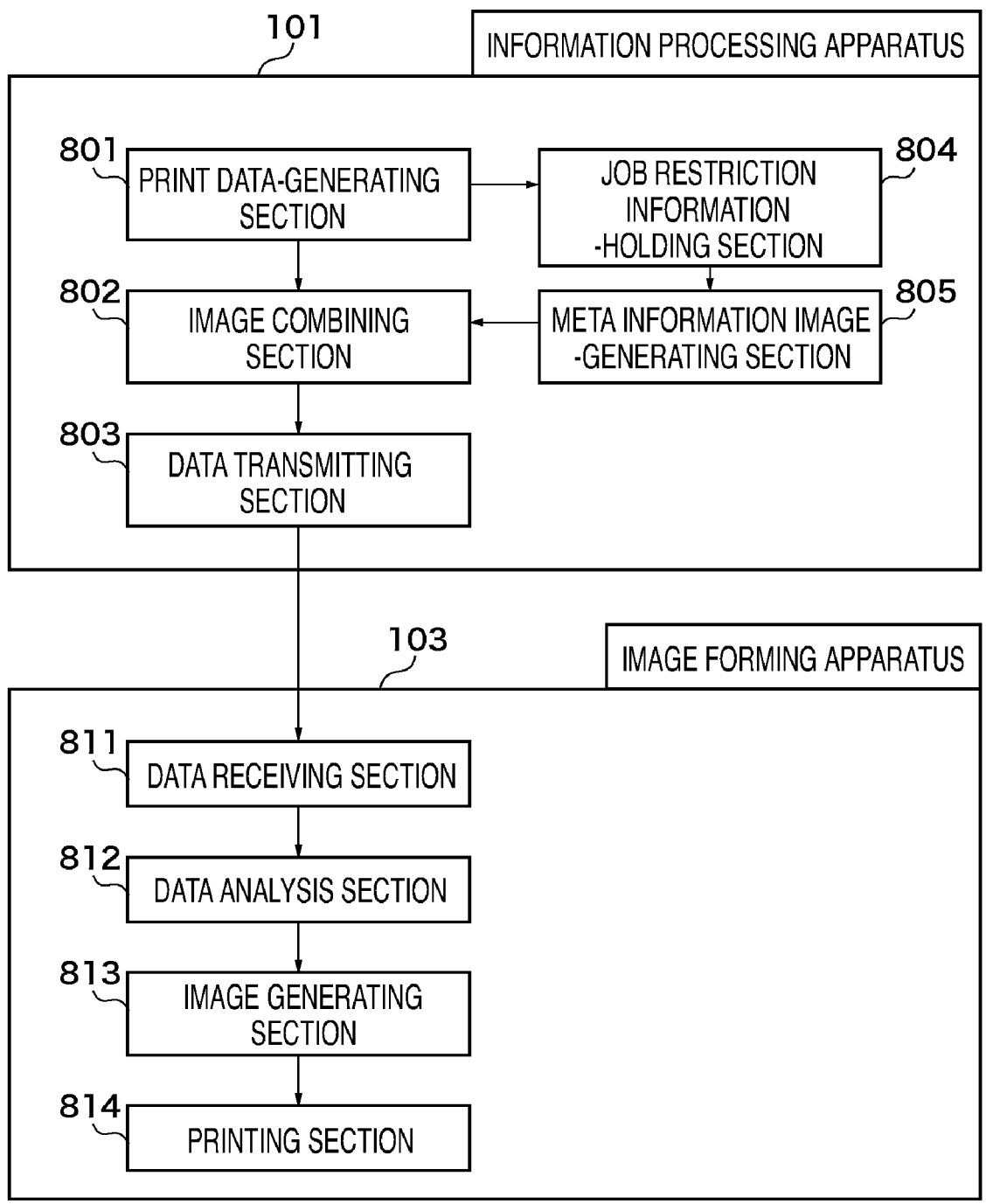
FIG. 10 is a data flow diagram illustrating how a printout is generated by the image forming apparatus control system shown in FIG. 1 in the case where the system is implemented by a method in which a background image of the printout is generated by the information processing apparatus.

FIG. 10 is a data flow diagram showing how a printout is generated in a case where in the image forming apparatus control system shown in FIG. 1, an implementing method is adopted in which a background image of the printout is generated by the information processing apparatus. Blocks shown in FIG. 10 are provided in the image processing apparatus 101 and the image forming apparatus 103 in the form of corresponding software modules, hardware components, or combinations of these. It should be noted that the information processing apparatus 101 is provided with blocks 801 to 805 in FIG. 10 in addition to the blocks 201 to 205 described hereinabove with reference to FIG. 3.

As shown in FIG. 10, the information processing apparatus 101 includes a print data-generating section 801, an image combining section 802, a data transmitting section 803, the job restriction information-holding section 804, and a meta information image-generating section 805.

The print data-generating section 801 is started up in response to a printing instruction which is given to the information processing apparatus 101 by the user operating the same. The print data-generating section 801 is implemented by a printing sub system in which the printer driver and an OS operate in collaboration with each other.

The print data-generating section 801 converts a document printing of which is instructed by the user to a group of image forming commands to be given to the image forming apparatus 103. More specifically, the conversion is performed e.g. by generating PDL (Page Description Language). The print data-generating section 801 transmits the generated print data to the image combining section 802.

On the other hand, the job restriction information-holding section 804 transmits job restriction information held therein as a result of operations performed by the user on the copy security configuration dialog 401 in FIG. 6 to the meta information image-generating section 805.

The meta information image-generating section 805 generates a background image including the copy inhibiting information and the tracking information based on the job restriction information received from the job restriction information-holding section 804. The background image can be generated e.g. by a method using the above-described LVBC. The meta information image-generating section 805 transmits the generated background image to the image combining section 802.

The image combining section 802 combines print data received from the print data-generating section 801 and the background image received from the meta information image-generating section 805 and produce print commands to the image forming apparatus 103 such that the background image is to be inserted into each page of the print data.

More specifically, for example, there is a method of embedding the background image in PDL as overlay form information. The image combining section 802 transmits the combined print data including the print commands to the data transmitting section 803.

The data transmitting section 803 controls a network interface to thereby transmit the combined print data to the print server 102 or the image forming apparatus 103. FIG. 10 illustrates a logical flow of data, and hence even in the case of the data being transmitted by way of the print server 102, the print sever 102 is omitted from FIG. 10.

The image forming apparatus 103 includes a data receiving section 811, a data analysis section 812, an image generating section 813, and a printing section 814.

The data receiving section 811 awaits data from the network 105 by controlling the network interface. The data receiving section 811 detects that the data is transmitted from another node on the network 105 to thereby transfer the received data to appropriate sub system according to the type thereof.

Selection of the type of data is generally performed by a port number when the communication method is TCP/IP based. In the present embodiment, it is assumed that the received data is print data including print commands to the image forming apparatus 103, and the data receiving section 811 determines that received data is print data and then passes the data to the data analysis section 812.

The data analysis section 812 extracts image forming commands (PDL) out of the data received from the data receiving section 811 and interpret them to generate intermediate data that the image forming apparatus 103 internally uses. The data analysis section 812 sequentially transmits the generated intermediate data to the image generating section 813.

The image generating section 813 controls RIP (Raster Image Processor), not shown, to convert the intermediate data received from the data analysis section 812 to a bit-mapped image. The image generating section 813 compresses the bit-mapped image, and then transmits the compressed bit-mapped image to the printing section 814. The printing section 814 prints the bit-mapped image received from the image generating section 813 on a sheet of paper.

FIG. 11 is a table listing cases of the print restriction information affecting the embedding of coy restriction information, by way of example, in the image forming apparatus control system shown in FIG. 1.

FIG. 11 shows four kinds of restriction and explanations of problems each of which occurs when an associated piece of copy restriction information is embedded in an image.

Color print restriction is a function of causing print data to be printed in monochrome even when the print data is color data. In general, color printing is costly, and hence general users are caused to print in monochrome to thereby achieve cost reduction. However, when printing in color (e.g. in yellow) is designated as a printing condition of LVBC for copy restriction information, LVBC is printed not in yellow but in black, which prevents the demand of using an unobtrusive color from being met.

Similarly, in color scan restriction, when an image is read by a scanner and is stored as an image file, such as PDF, there arises the same problem as occurs with the color printing restriction. The LVBC is automatically changed into black dots, and hence it is impossible to embed the LVBC using an unobtrusive color and store the image as an image file. The copy restriction information and print restriction information incompatibility-determining section 212 of the management server 104 determines whether or not it is necessary to change the print restriction information based on which of the cases shown in FIG. 11 the present case matches. It should be noted that the information for identifying the method of embedding the copy restriction information may be set in the management server 104 in advance, or the copy restriction information itself stores the information for identifying the method of embedding the copy restriction information. The information for identifying the method of embedding the copy restriction information (conditions for printing the copy restriction information) includes information on whether the copy restriction information is embedded as LVBC, or as a barcode or a QR code, and whether the same is embedded as a color image or a monochrome image.

Figure 12:
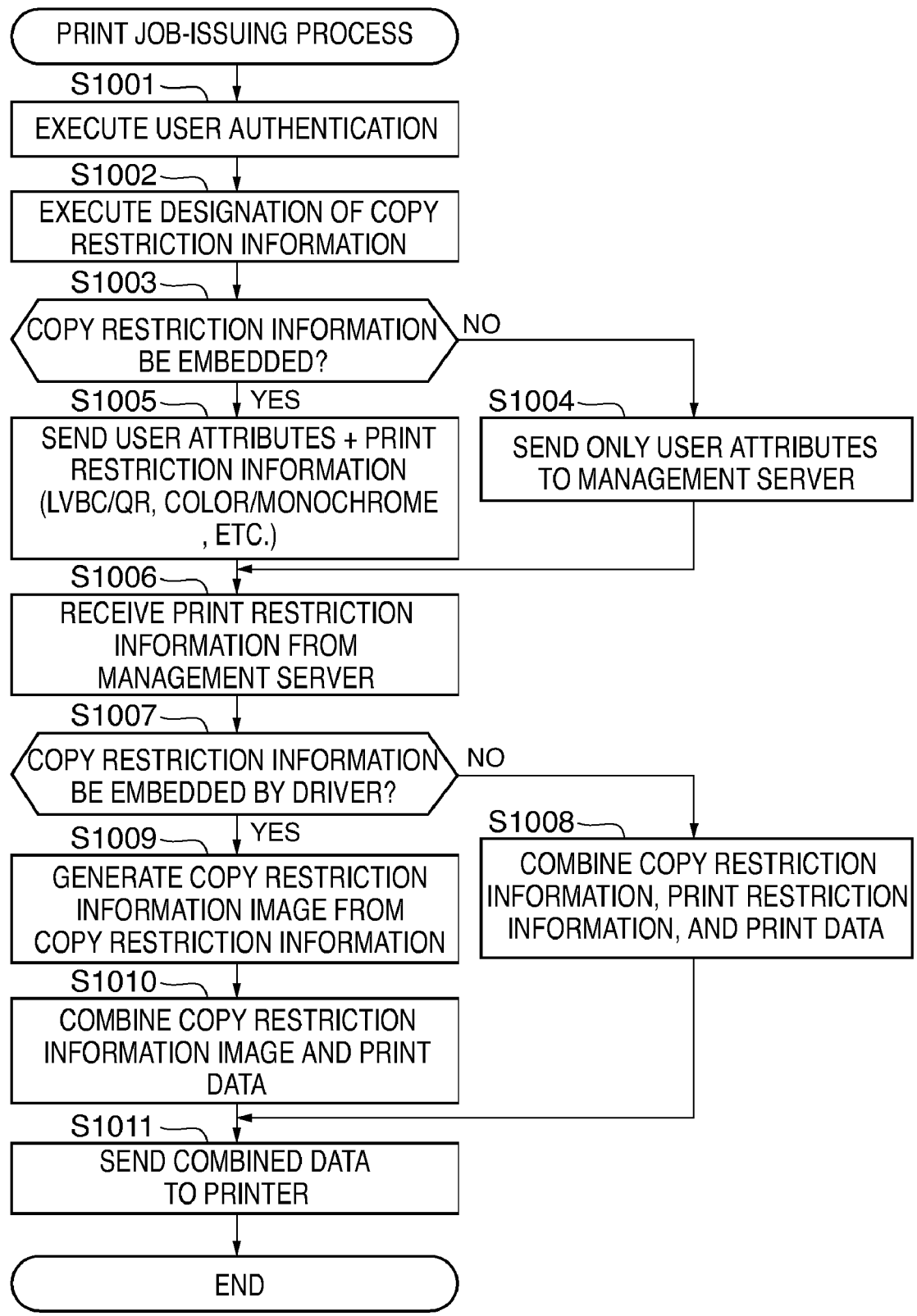
FIG. 12 is a flowchart of a print job-issuing process performed by the information processing apparatus appearing in FIG. 1.

FIG. 12 is a flowchart of a print job-issuing process executed by the information processing apparatus appearing in FIG. 1. The print job-issuing process is executed by the CPU of the information processing apparatus 101 (the CPU 1402 in FIG. 2).

As shown in FIG. 12, first, the image processing apparatus 101 acquires a user ID of the user who instructed the transmission of print data, and executes processing for user authentication (step S1001). The user ID may be any user information insofar as it enables the user to be uniquely identified. In the step S1001, the image processing apparatus 101 executes the user authentication based on the user ID and a password input thereto by the user. Subsequently, the image processing apparatus 101 executes designation of copy restriction information (step S1002). This is the same processing described hereinbefore with reference to FIG. 6, executed for setting details of copy restriction information, such as inhibition of copying, for example.

Next, the image processing apparatus 101 determines whether or not the copy restriction information (e.g. LVBC) is to be embedded (step S1003). If the copy restriction information is not to be embedded, the image processing apparatus 101 transmits the user ID stored during the user authentication (step S1001) to the management server 104 (step S1004). If the copy restriction information is to be embedded, the image processing apparatus 101 transmits not only the user ID but also the copy restriction information designated in the step S1002 to the management server 104 (step S1005).

Subsequently, the image processing apparatus 101 receives the print restriction information which the management server 104 returns based on the information transmitted thereto (step S1006). A print restriction management process executed by the management server 104 for returning the print restriction information will be described hereinafter with reference to FIG. 13.

There are two different modes of embedding copy restriction information: One mode is to embed the information by a printer driver installed in the information processing apparatus 101 and the other mode is to embed the same by the image forming apparatus 103. The image processing apparatus 101 determines in which of the above-mentioned modes the copy restriction information is to be embedded (step S1007). If the embedding is not to be performed by the printer driver (No to the step S1007), the print restriction information and the copy restriction information (e.g. LVBC) and the print data are combined into a form for transmission (step S1008).

When the copy restriction information is to be embedded by the printer driver (Yes to the step S1007), first, a copy restriction information image, such as a barcode image including LVBC, is generated based on the copy restriction information (step S1009). In doing this, the copy restriction information image can be generated in either of two forms: in a form combined with a printed document, and in a form of overlay data separate from a printed document. The copy restriction information image generated in the step S1009 may be image data itself which shows a barcode, or code information which can be converted by the image forming apparatus 103 into image data of the barcode.

Subsequently, the image restriction information and the print data are combined into a form for transmission (step S1010). It should be noted that the print data has details of restriction designated by the print restriction information received from the management server 104 reflected thereon. Then, the combined data is transmitted to the image forming apparatus (printer) 103 over the network 105 (step S1011), followed by terminating the present process.

Figure 13:
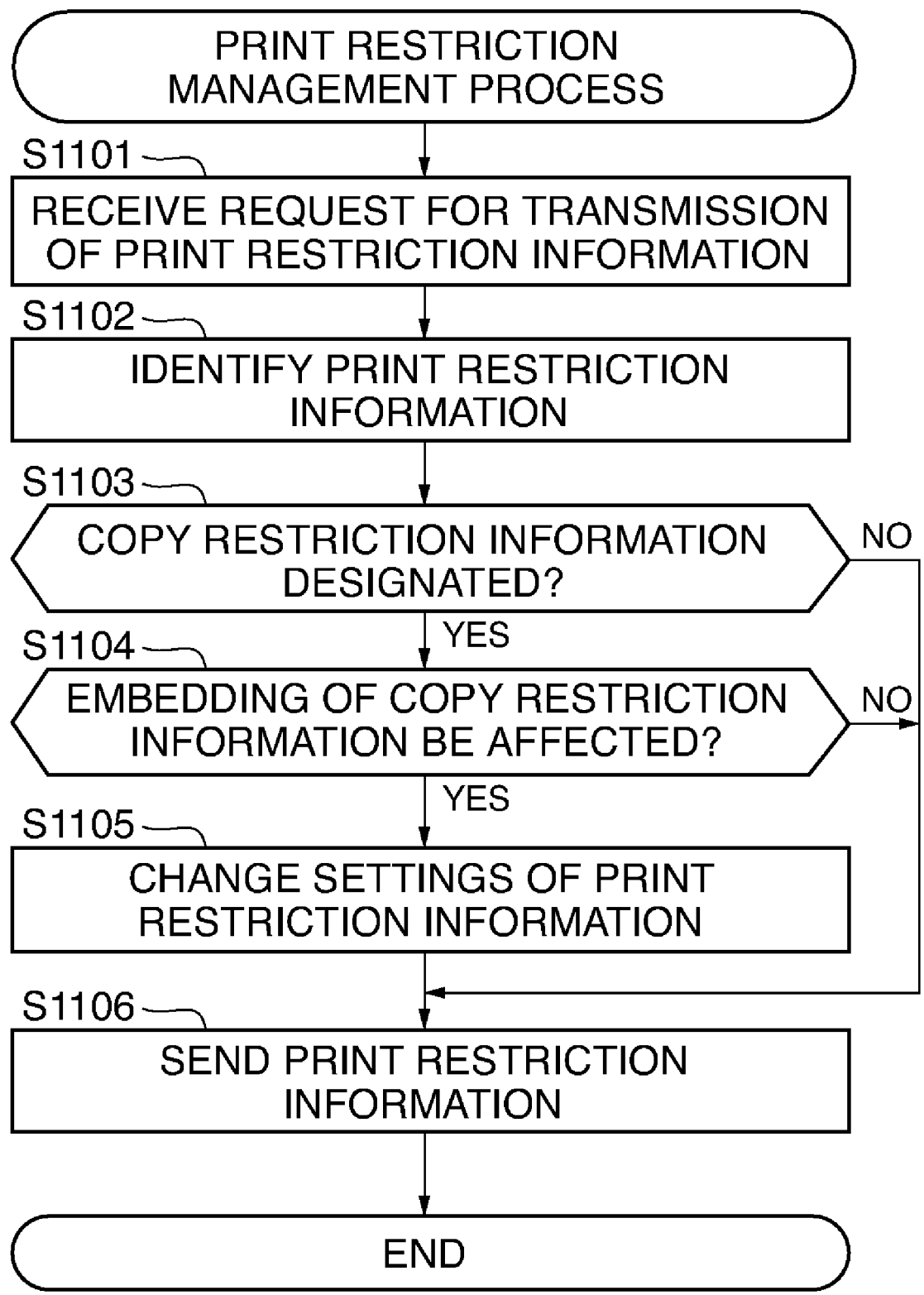
FIG. 13 is a flowchart of a print restriction management process performed by the management server appearing in FIG. 1.

FIG. 13 is a flowchart of the print restriction management process performed by the management server appearing in FIG. 1. The present print restriction management process is performed by the CPU of the management server 104 (the CPU 1402 in FIG. 2).

As shown in FIG. 13, first, the management server 104 receives a request for transmitting the print restriction information from the information processing apparatus 101. At the same time, the management server 104 receives the user ID from the information processing apparatus 101 (step S1011). Further, if the copy restriction information is to be added to the print data generated by the information processing apparatus 101, the management server 104 receives the copy restriction information as well. Subsequently, using the received user ID as a key, the management server 104 extracts print restriction information which was registered beforehand in association with the user ID (step S1102).

The management server 104 determines whether or not copy restriction information is included in the information received in the step S1101 (step S1103). If the copy restriction information is included, the management server 104 determines based on the printing conditions of the copy restriction information whether or not there is any item of print restriction information that affects the embedding of the copy restriction information (step S1104). If the copy restriction information is included and there is any item of print restriction information that affects the embedding of the copy restriction information, the process proceeds to a step S1105, whereas if not, the process proceeds to a step S1106.

Then, the management server 104 deletes from the user-specific print restriction information extracted beforehand the item(s) which affect(s) the embedding of the copy restriction information (step S1105). Let's consider, for example, a case in which assuming that the copy restriction information is to be embedded using yellow dots of LVBC, the print restriction information inhibits the user from executing color printing (permits only monochrome printing). In this case, although the LVBC is desired to be embedded in yellow dots, the color of the dots is forcedly changed into black due to the print restriction information. To cope with such a case, the item of inhibiting color printing is deleted from the print restriction information. Further, assuming that the inhibition of single-sided printing to force execution of double-sided printing is designated in the print restriction information, if it is judged that this affects the embedding of the copy restriction information, the item of inhibiting single-sided printing is deleted from the print restriction information. Then, the finally remaining items of print restriction information are transmitted to the information processing apparatus 101 (step S1106), followed by terminating the present process.

In the first embodiment, a description has been given of the case where in embedding copy restriction information, settings of print restriction affecting the embedding of the copy restriction information are temporarily cancelled to execute printing of the print data. This causes the print image data to be printed together with the copy restriction information without being affected by the settings of print restriction which have been cancelled.

It should be note that the processing in the step S1105 in FIG. 13 can be executed in a manner other than the above. For example, when deleting the item of inhibiting color printing from the print restriction information, color printing may be permitted only for a barcode part, and for the other part, color printing may be inhibited according to the print restriction information. This makes it possible to make the restriction of printing by print restriction information and the embedding of copy restriction information compatible with each other in a more sophisticated manner.

Next, a description will be given of a second embodiment of the present invention. The second embodiment is only distinguished from the first embodiment in that printing is performed by cancelling print restriction only for the copy restriction information but applying the print restriction to the remaining part of printout, and has the same configuration as that of the first embodiment in the other respects including hardware configuration. Therefore, corresponding component parts are designated by the same reference numerals, and description thereof is omitted.

Figure 14:
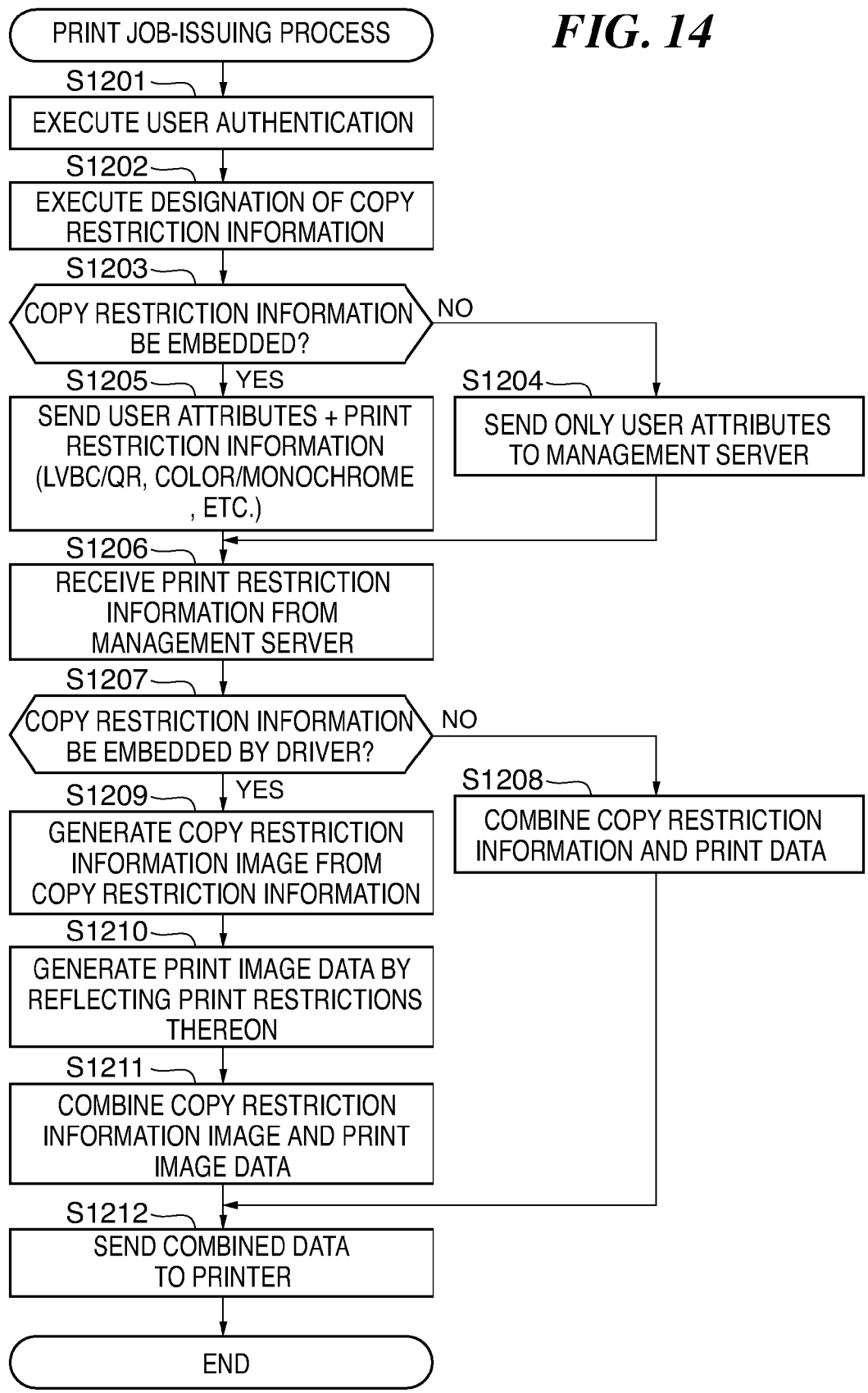
FIG. 14 is a flowchart of a print job-issuing process executed by an information processing apparatus in an image forming apparatus control system as a printing system according to a second embodiment of the present invention.

FIG. 14 is a flowchart of a print job-issuing process executed by an information processing apparatus in an image forming apparatus control system as a printing system according to a second embodiment of the present invention. The print job-issuing process is executed by the CPU of the information processing apparatus 101 (the CPU 1402 in FIG. 2).

As shown in FIG. 14, the information processing apparatus 101 performs user authentication so as to permit a user to use the image forming apparatus 103 based on a user ID and a password inputted by the user to the information processing apparatus 101 (step S1201). Subsequently, the image processing apparatus 101 executes designation of copy restriction information (step S1202).

Next, it is determined whether or not copy inhibiting information (e.g. LVBC) is to be embedded (step S1203). If the copy inhibiting information is not to be embedded, the information processing apparatus 101 transmits the user ID stored during the user authentication to the management server 104 (step S1204), whereas if the copy inhibiting information is to be embedded, the information processing apparatus 101 transmits not only the user ID but also the copy restriction information input in the step S1201 to the management server 104 (step S1205).

Subsequently, the information processing apparatus 101 receives the print restriction information returned from the management server 104 based on the transmitted information (step S1206). A print restriction management process executed by the management server 104 for returning the print information will be described hereinafter with reference to FIG. 15.

There are two different modes of embedding copy restriction information: One mode is to embed the information by a printer driver installed in the information processing apparatus 101 and the other mode is to embed the same by the image forming apparatus 103. The image processing apparatus 101 determines in which of the above-mentioned modes the copy restriction information is to be embedded (step S1207). If the embedding is not to be performed by the printer driver (No to the step S1207), the print restriction information, the copy restriction information (e.g. LVBC), and the print data are combined into a form for transmission (step S1208).

In the second embodiment, items of print restriction information affecting the embedding of copy restriction information are prevented from acting on the copy restriction information. To this end, in the step S1208, information specifying that the print restriction is not to act on the copy restriction information is combined with the print data. More specifically, as described hereinafter with reference to FIG. 15, from the management server 104, the image processing apparatus 101 receives print restriction information as a list classifying items of print restriction information into a group affecting the embedding of copy restriction information and a group not affecting the embedding of copy restriction information. The image processing apparatus 101 generates information specifying that only the items of print restriction information not affecting the embedding of copy restriction information are caused to act on the copy restriction information, and combines the generated information with the print data. On the other hand, the image processing apparatus 101 generates information specifying that all items of print restriction information are caused to act on the print data other than the copy restriction information, and combines the generated information with the print data.

On the other hand, if the copy restriction information is to be embedded by the printer driver (Yes to the step S1207), first, the image processing apparatus 101 generates a copy restriction information image, such as LVBC, based on the copy restriction information (S1209). In doing this, only the items of the print restriction information not affecting the embedding of the copy restriction information are caused to act on the generation of the print restriction information image. For example, even if the print restriction information inhibits color printing, yellow dots of LVBC are generated. This is because the item of inhibiting color printing affects the embedding of copy restriction information. On the other hand, all the items of print restriction information are permitted to act on the print data other than the copy restriction information. In doting this, it is possible to employ either of the two methods: one in which the LVBC as the copy restriction information is combined with a printed document, and the other in which the LVBC data as the copy restriction information is generated as overlay data separate from the print data. The LVBC image generated in the step S1209 may an image data representative of LVBC itself, or code information which can be converted by the image forming apparatus 103 into image data of the LVBC.

Then, the image processing apparatus 101 generates print data such that the print restriction information received from the management server 104 is reflected thereon (step S1210). If monochrome printing is forced, the print data is converted from color data to monochrome data. Thus, the data generated by the image processing apparatus 101 are combined into a form for transmission (step S1211). The data generated by the image processing apparatus 101 are the copy restriction information image and the print data (on which the print restriction is reflected).

Subsequently, the combined data is transmitted to the image forming apparatus (the printer) over the network 105 (step S1212), followed by terminating the present process.

FIG. 15 is a flowchart of the print restriction management process performed by the management server in the image forming apparatus control system according to the second embodiment of the present invention. The print restriction management process is performed by the CPU of the management server 104 (the CPU 1402 in FIG. 2).

As shown in FIG. 15, first, the management server 104 receives a request for transmitting the print restriction information from the information processing apparatus 101. At the same time, the management server 104 receives the user ID from the information processing apparatus 101 (step S1301). Further, if the copy restriction information is to be added to the print data generated by the information processing apparatus 101, the management server 104 receives the copy restriction information as well. Subsequently, using the received user ID as a key, the management server 104 extracts print restriction information which was registered beforehand in association with the user ID (step S1302).

The management server 104 determines whether or not the copy restriction information is included in the information received in the step S1301 (step S1303). If the copy restriction information is included, the management server 104 determines based on the printing conditions of the copy restriction information whether or not there is any item of print restriction information that affects the embedding of the copy restriction information (step S1304). If the copy restriction information is included and there is any item of print restriction information that affects the embedding of the copy restriction information, the process proceeds to a step S1305, whereas if not, the process proceeds to a step S1306.

Then, the management server 104 generates (forms) a list classifying items of the user-specific print restriction information into a group affecting the embedding of copy restriction information and a group not affecting the embedding of copy restriction information (step S1304). For example, assuming that the copy restriction information is to be embedded as color dots of LVBC, if the print restriction information includes an item of inhibiting color printing, this item is classified into the group affecting the embedding of copy restriction information. This is because the embedding of the dots of LVBC in color conflicts with the inhibition of color printing. On the other hand, when the copy restriction information is to be embedded as monochrome dots of LVBC, the item of inhibiting color printing is classified into the group not affecting the embedding of copy restriction information. Further, if the print restriction information includes an item of inhibiting single-sided printing (forcing double-sided printing), depending on the type of sheets used for printing, this item is required to be classified into the group affecting the embedding of copy restriction information. For example, if images are printed on both sides of a thin sheet, an image on the reverse side can appear in the embedded copy restriction information (dots of LVBC), which prevents the copy restriction from being properly read from the sheet subjected to double-sided printing when the sheet is used as an original for copying. However, for the management server 104 to determine whether the item of inhibiting single-sided printing affects the embedding of copy restriction information, it is necessary to identify the type of sheet used in the printing. To identify the type of sheet, the management server 104 is only required, in the step S1301, to acquire from the information processing apparatus 101 information specifying the type of sheet set by the printer driver.

Then, in response to the request from the information processing apparatus 101, the management server 104 sends back a response containing the print restriction information as a list classifying the items of the print restriction information into a group affecting the embedding of copy restriction information and a group not affecting the embedding of copy restriction information (step S1305), followed by terminating the present process.

As is distinct from the first embodiment, the management server 104 sends the list containing the group of items that affect the embedding of copy restriction information and the group of items that do not affect the embedding of copy restriction information in return to the request from the information processing apparatus 101. This is necessary for notifying the image forming apparatus 103 of print restrictions which should not be caused to act on the data of copy restriction information to be embedded when the image forming apparatus 103 performs embedding of copy restriction information in the processing shown in FIG. 14.

It is to be understood that the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above-described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above-described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above-described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

Further, it is to be understood that the functions of either of the above-described embodiments may be accomplished not only by executing the program code read out by a computer, but also by causing an OS (operating system) or the like which operates on the computer to perform a part or all of the actual operations based on instructions of the program code.

In this case, the program code is supplied from a storage medium in which the program code is stored, or is supplied by downloading directly from another computer, a database, or the like, not shown, connected to the Internet, a commercial network, a local area network, or the like.

Although in the above described embodiments, the printing process carried out by the multi-function apparatus is the electrophotographic process, the present invention is not limited to this, but the present invention may be applied to various printing processes such as inkjet printing, thermal transfer printing, thermal printing, electrostatic printing, and discharge breakdown printing.

The form of the above program code may be an object code, a program executed by an interpreter, script data supplied to an OS (Operating System), or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-146949 filed Jun. 1, 2007, which is hereby incorporated by reference herein in its entirety.

What is claimed is:

1. A printing system including an information processing apparatus, and a printing apparatus that performs image formation based on print data transmitted from the information processing apparatus, comprising:

a print restriction information-acquiring unit configured to acquire print restriction information for restricting use of functions concerning printing processing which can be specified in the print data;

a copy restriction information-acquiring unit configured to acquire copy restriction information for restricting copying of a printed document printed based on the print data, the copy restriction information including printing conditions;

a copy restriction information-adding unit configured to add the copy restriction information acquired by said copy restriction information-acquiring unit to the print data;

a determination unit configured to determine whether or not the print restriction information and the printing conditions of the copy restriction information are incompatible; and a changing unit configured to change the print restriction information in a case where the determination unit determines that the print restriction information and the printing conditions of the copy restriction information are incompatible;

wherein the print restriction information includes information for restricting execution of color printing by the printing apparatus; and wherein when the print restriction information contains information for restricting execution of color printing by the printing apparatus, and the copy restriction information is color image data, said changing unit changes the information for restricting execution of color printing, such that the restriction of color printing by the printing apparatus is invalidated.

2. A printing system as claimed in claim 1, wherein the print restriction information includes information for identifying users who are permitted to use the printing apparatus, the printing system further comprising a user information-acquiring unit configured to acquire information for identifying a user who gives an instruction for causing the printing apparatus to execute printing processing based on the print data, wherein said print restriction information-acquiring unit acquires the print restriction information associated with the user, based on the information for identifying the user which has been acquired by said user information-acquiring unit.

3. A printing system as claimed in claim 2, further comprising a print restriction information-managing device configured to store a plurality of items of the print restriction information associated with a plurality of users who are permitted to use the printing apparatus, and wherein said print restriction information-acquiring unit acquires the print restriction information from said print restriction information-managing device.

4. A printing system as claimed in claim 1, wherein the print restriction information includes information for restricting execution of single-sided printing by the printing apparatus.

5. A printing system as claimed in claim 1, wherein said copy restriction information-adding unit adds the copy restriction information to the print data, as barcode data representative of contents of the copy restriction information.

6. A printing system as claimed in claim 1, wherein the printing apparatus performs printing after adding a barcode image generated based on the copy restriction information to an image generated based on the print data.

7. A printing system as claimed in claim 4, wherein said changing unit changes the information for restricting execution of single-sided printing, such that the restriction of single-sided printing by the printing apparatus is invalid in a case where a sheet used by the printing apparatus comprises a specified type of sheet.

8. A print restriction method for a printing system including an information processing apparatus, and a printing apparatus that performs image formation based on print data transmitted from the information processing apparatus, comprising:

a print restriction information-acquiring step of acquiring print restriction information for restricting use of functions concerning printing processing which can be specified in the print data;

a copy restriction information-acquiring step of acquiring copy restriction information for restricting copying of a printed document printed based on the print data, the copy restriction information including printing conditions;

a copy restriction information-adding step of adding the copy restriction information acquired in said copy restriction information-acquiring step to the print data;

a determination step of determining whether or not the print restriction information acquired in said print restriction information-acquiring step and the printing conditions of the copy restriction information acquired in said copy restriction information-acquiring step are incompatible; and a change step of changing the print restriction information in a case where the determination step determines that the print restriction information and the printing conditions of the copy restriction information are incompatible;

wherein the print restriction information includes information for restricting execution of color printing by the printing apparatus; and wherein when the print restriction information contains information for restricting execution of color printing by the printing apparatus, and the copy restriction information is color image data, said changing step changes the information for restricting execution of color printing, such that the restriction of color printing by the printing apparatus is invalidated.

9. A non-transitory computer-readable storage medium storing a program for causing a computer to execute a print restriction method for a printing system including an information processing apparatus, and a printing apparatus that performs image formation based on print data transmitted from the information processing apparatus, wherein the print restriction method comprises:

a print restriction information-acquiring step of acquiring print restriction information for restricting use of functions concerning printing processing which can be specified in the print data;

a copy restriction information-acquiring step of acquiring copy restriction information for restricting copying of a printed document printed based on the print data the copy restriction information including printing conditions;

a copy restriction information-adding step of adding the copy restriction information acquired in said copy restriction information-acquiring step to the print data;

a determination step of determining whether or not the print restriction information acquired in said print restriction information-acquiring step and the printing conditions of the copy restriction information acquired in said copy restriction information-acquiring step are incompatible; and a change step of changing the print restriction information in a case where the determination step determines that the print restriction information and the printing conditions of the copy restriction information are incompatible;

wherein the print restriction information includes information for restricting execution of color printing by the printing apparatus; and wherein when the print restriction information contains information for restricting execution of color printing by the printing apparatus, and the copy restriction information is color image data, said changing step changes the information for restricting execution of color printing, such that the restriction of color printing by the printing apparatus is invalidated.

* * * * *